United States Patent [19]

Chaudhari et al.

[11] 3,820,087

[45] June 25, 1974

[54] THREE DIMENSIONAL MEMORY

[75] Inventors: Praveen Chaudhari, Briarcliff Manor, N.Y.; Charles B. Zarowin, Rowayton, Conn.

[73] Assignee: International Business Machines Corporation, Armonk, N.Y.

[22] Filed: Dec. 29, 1972

[21] Appl. No.: 319,405

[52] U.S. Cl.... 340/173 LM, 340/173 R, 350/160 R

[51] Int. Cl......................... G11c 11/42, G11c 13/04

[58] Field of Search................. 340/173 R, 173 LM; 317/234; 350/160 R

[56] References Cited

UNITED STATES PATENTS 3,665,425 5/1972 Feinleib ............................ 340/173

*Primary Examiner*—Terrell W. Fears

*Attorney, Agent, or Firm*—George Baron

[57] ABSTRACT

A three dimensional memory using materials switchable from an amorphous state to a crystalline state and back again to its amorphous state is realized by focusing a laser beam into different depths of the material. The material, when in its crystalline state, is capable of generating the harmonic of the frequency of the incident light used to interrogate its state, whereas in its amorphous state it is not a generator of harmonics. The detection of this harmonic allows for increased discrimination in the data reading process.

5 Claims, 5 Drawing Figures

| READ | WRITE |
| --- | --- |
| NO HARMONIC GENERATION | AMORPHOUS STATE |
| SECOND HARMONIC GENERATION | CRYSTALLINE STATE |

THREE DIMENSIONAL MEMORY

BACKGROUND OF THE INVENTION

Binary data storage units, or memories, play an exceedingly important part in all data processing devices. One always strives to attain, not only accurate binary storage, but high density storage. Wherever possible, not only does one seek high density storage, but also compactness. A recent implementation for achieving both high density and small size has been the use of three dimensional memories. Representative three dimensional memories are exemplified by U.S. Pat. No. 3,654,626 which issued on Apr. 4, 1972 to M. Geller et al., U.S. Pat. No. 3,508,208 which issued on Apr. 21, 1970 to M. A. Duguay et al. and U.S. Pat. No. 3,296,594 which issued on Jan. 3, 1967 to P. J. Van Heerden.

In all the above cited patents, and others in the prior art related to them, both writing and reading take place with a laser beam wherein the latter is focused and directed into a spot in the volume of the material serving as the memory. However, in the example set forth by this invention, the "write" laser beam will deposit more energy at the spot than the "read" beam and will change the physical characteristic of the spot of material that was selected either from an amorphous state to a crystalline state, or vice versa. Read-out occurs at a spot because the physical change of condition or property brought on by the laser beam transmits or reflects differently the inquiring or read-out laser beam than would the unchanged property of the spot. But such changes in transmission or reflectivity are generally linear changes, and discrimination between a changed spot and an unchanged spot may require very sensitive detectors as well as being subject to false signals.

SUMMARY OF THE INVENTION

The present invention employs a material, as the memory element, which has two states, amorphous and crystalline. A focused laser beam depositing sufficient energy but low power in a selected spot changes the spot from its amorphous state to its crystalline state, or reverse. Only the crystalline state of the material, when interrogated by the same laser beam, when it has sufficiently high power but not sufficient energy to change the crystalline state of the spot being read out, produces optical harmonic generation; thus the interrogating beam, after it has been transmitted through a spot of the material in the crystalline state, will contain in it a frequency which is an harmonic of the frequency of the interrogating light beam. Since harmonic generation is a nonlinear phenomenon, greater discrimination can be achieved during read-out between an amorphous state of a spot and its crystalline state. It is relatively simple to employ detectors that readily discriminate between a frequency and its harmonic.

The foregoing and other objects, features, and advantages of the invention will be apparent from the following more particular description of the preferred embodiments of the invention as illustrated in the accompanying drawings.

Figure 1:
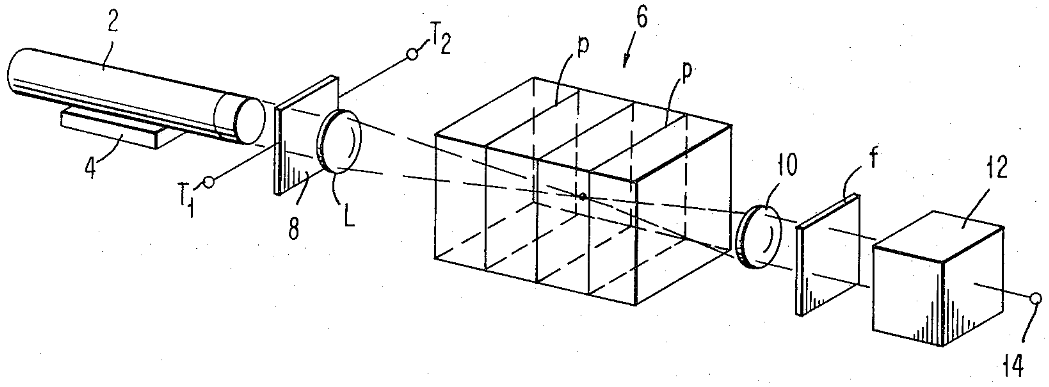
FIG. 1 is a schematic showing of the write and read-out system forming the invention.

The writing of information into a three dimensional storage medium using a laser beam is well known and does not form part of this invention. Such conventional structure will comprise a laser source 2 capable of being tuned to generate at different frequencies, or would consist of two adjacently located lasers wherein each is capable of generating a laser beam at a desired frequency. The laser 2 is held by a controllably movable support 4 which is positionable to direct focal points of energy to different positions within the three dimensional volume of the absorptive material 6 that is the storage unit. Interposed between laser 2 and memory 6 are a light deflector 8 and a focusing unit represented symbolically by a lens L. Writing will take place in different planes *p* in the memory wherein each bit of material that is converted from its amorphous to crystalline state will have dimensions of the order of the laser wavelength and the spacing between planes p of the order of several wavelengths. Terminals $T_1$ and $T_2$ are adapted to receive pulses for actuating light deflector 8 if it be of the electro-optical variety.

Certain materials that are particularly useful and are preferred as the block making up memory unit 6 are amorphous chalcogenide semiconductor materials. Various combinations of this class of chalcogenides can be made to change from their respective amorphous states to their respective crystalline states. One such member of the class used merely to illustrate the invention is $Te_{85}Ge_{11}As_4$. Its absorption curve, shown in FIG. 2, indicates that at values of light greater than 2.0$\mu$ the absorption is low but becomes quite high at values of light in the infra-red and far infra-red portion of the spectrum.

Figures 4, 5:
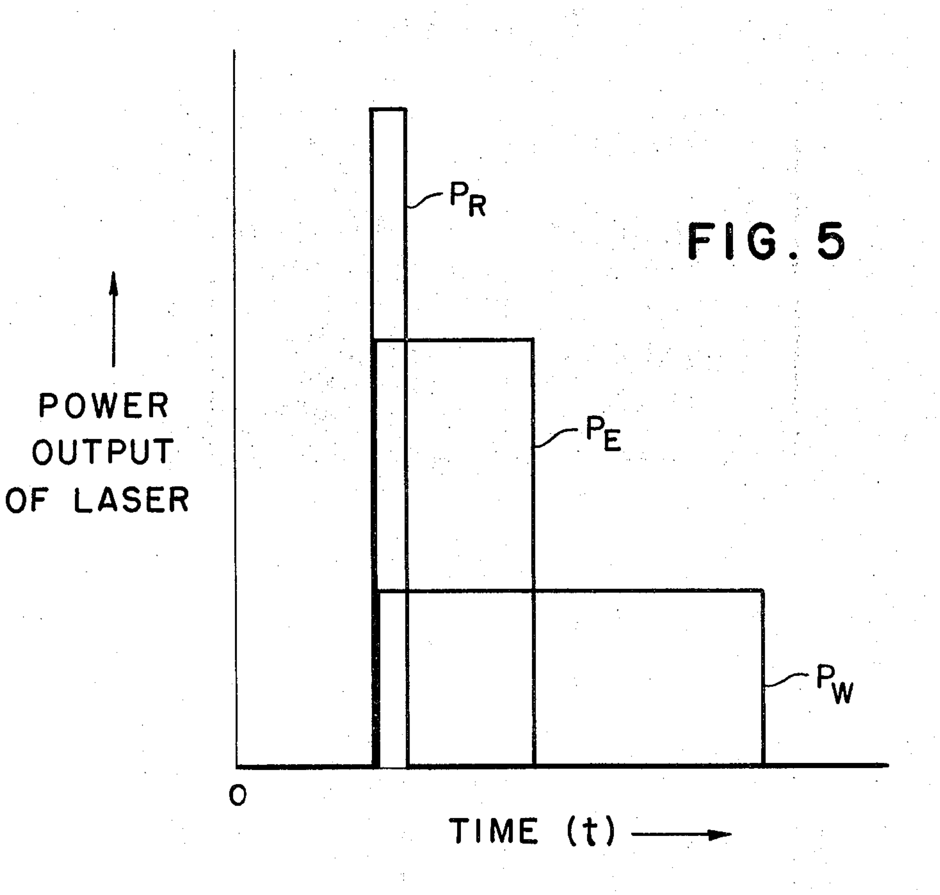
FIG. 4 is a chart defining the read and write characteristic of the three dimensional memory as an aid in understanding the invention.
FIG. 5 shows the time variation of the power of the laser pulse that distinguishes between the write, read and erase modes.

FIG. 5 illustrates the relative values of the write, read and erase pulses needed to carry out the invention as a useable memory. In general, the laser should be selected or tuned to have an output frequency near the absorptive region of the amorphous chalcogenide, or somewhere between 0.6 and 1$\mu$. The energy in the writing beam will be higher, the deeper one wishes to write into storage unit 6. Thus the power of the writing pulse $P_W$ is applied for a long enough time period so that it changes a selected spot from its amorphous state to its crystalline state. In the case of a specific member of the class of amorphous chalcogenides, such $Te_{85}Ge_{11}As_4$, the change of state from amorphous to crystalline, Te separates out of the compound and it is the Te that is a second harmonic generator. When it is desired to erase the information, a pulse $P_E$, having a higher amplitude than that of the $P_W$ pulse but lasting for a shorter time period, is applied to the selected spot. This erase pulse $P_E$ remelts the semiconductor and allows the precipitated Te to go back into its original form of $Te_{85}Ge_{11}As_4$.

If the selected spot is to be interrogated, the laser 2 is excited to apply a pulse $P_R$ to such spot. This pulse $P_R$ is very powerful, but is applied for a time *t* that is much less than the times for which $P_E$ and $P_W$ are applied. Consequently, the read pulse $P_R$ does not change the state of the selected spot being read, but does generate second harmonics in the Te if the $Te_{85}Ge_{11}As_4$ is in its crystalline state when interrogated, but does not generate a second harmonic when such compound is in its amorphous state.

A lens system 10 (see FIG. 1) focuses the light that passes through the selected spot onto a frequency detector 12, the latter sending out the appropriate electrical signal at an output terminal 14 of the frequency detector 12. It has been found, when growing the chalcogenide that will make up the solid memory 6, it is preferred that it be grown in its amorphous state, originally, in that the signal to noise ratio is higher when it goes from amorphous to crystalline rather than from crystalline to amorphous. The sensing of the crystallizing state for the storage of a binary "1" will result in the sensing of a second harmonic whereas the sensing of the amorphous state as a binary "1" will result in the sensing of an absorbed light beam. The second harmonic sensing gives a more easily detectable signal than the diminished signal arising when the transmission of light through the amorphous chalcogenide is detected to signal the presence of a "1".

Figure 2:
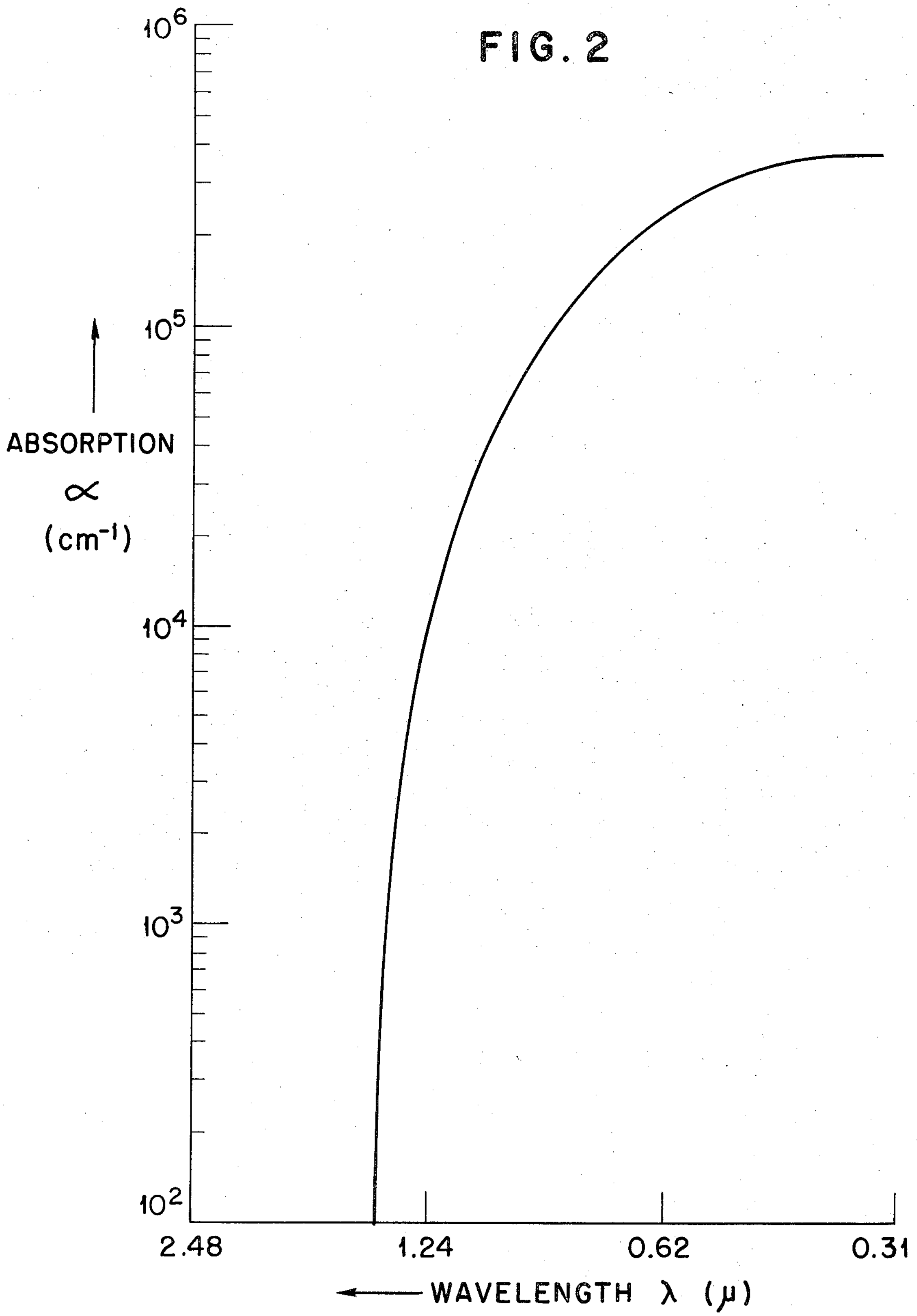
FIG. 2 is an absorption curve for a material capable of being changed from its amorphous to crystalline state when sufficient energy is applied to the material.

FIG. 2 is a plot of the absorption curve for the specific chalcogenide $Te_{85}Ge_{11}As_4$. Where the ordinate is the absorption coefficient $\alpha$ in. $cm^{-1}$ and the abscissa is the frequency in microns. Thus, laser 2 would be chosen as a krypton laser in that it emits at about 6300A which is the high absorptive region of $Te_{85}Ge_{11}As_4$. When a read pulse $P_R$ is applied to a spot in the memory 6 that is in its crystalline state, the precipitated Te acts as a second harmonic generator, generating a frequency that is a multiple of the initial frequency whose wavelength is 6,300A. The second harmonic generated would have a frequency of 3,150A. By placing a filter f in front of detector 12, the fundamental frequency of 6,300A could be cut off and only the second harmonic 3,150A would be sensed by detector 12.

Other laser sources can be used and one that emits in the 10.6$\mu$ region, even though it is outside the very absorptive region of the chalcogenide shown in FIG. 2, can be used for writing and erasing if there is enough energy in the laser beam to melt the $Te_{85}Ge_{11}As_4$. In such instance, the crystalline state of the chalcogenide will generate the second harmonic of 5.3$\mu$, and filter f is chosen to highly absorb 10.6$\mu$ but readily transmit 5.3$\mu$.

Figure 3:
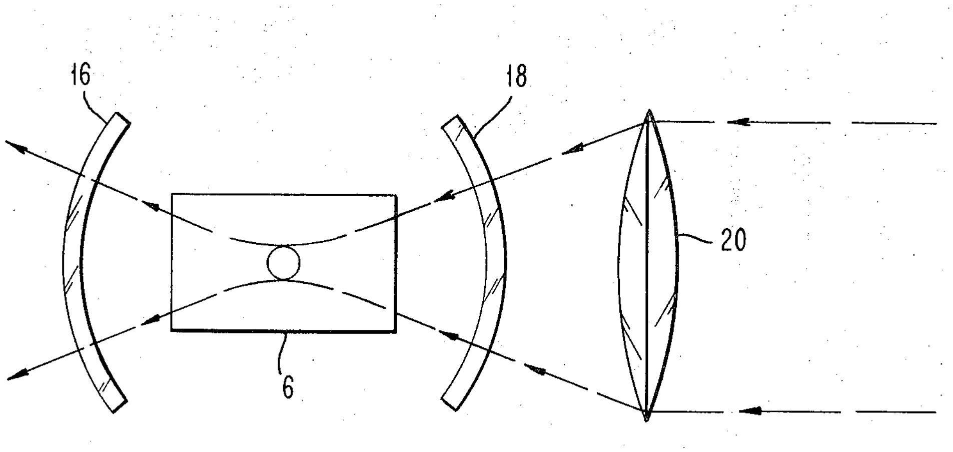
FIG. 3 is an embodiment of a readout system particularly suitable for amplifying output signals contained in the interrogating laser beam.

FIG. 3 sets out a scheme for enhancing the second harmonic frequency that is generated from those localized crystalline regions. The memory or storage block 6 of amorphous chalcogenide is located at the center of an optical cavity bounded by mirrors 16 and 18. The block 6 is within the region of the narrow "waist" of a confocal Fabry-Perot cavity formed by mirrors 16 and 18. Mirror 18 is highly transmissive of the interrogating wavelength $\lambda$ but is highly reflective at the second harmonic wavelength $\lambda/2$ at those surfaces facing memory unit 6. A coupling lens 20 focuses the input light from a laser source whose laser output has a wavelength $\lambda$. If the interrogated spot is in its crystalline state, the Fabry-Perot cavity acts as a parametric oscillator and an output signal at a wavelength of $\lambda/2$ appears outside mirror 16 to be sensed by detector 12.

The scanning of the memory block 6 does not form part of this invention and may be accomplished by mechanical or electrooptical movement of the storage medium 6 with respect to the confocal cavity so that different planes of storage can be accessed as well as unique bits in a plane of storage. Since orientation of the crystalline region in a memory block 6 is required to permit the production of the optical harmonic $\lambda/2$ (so that the laser beam being focussed by lens 20 onto the Fabry-Perot optical cavity is phase matched with the second harmonic $\lambda/2$ generated), a thermal gradient is introduced in the crystal 6 along that direction most appropriate for producing phase matching.

The various pulses set forth in FIG. 5 can be achieved with a single laser in the following ways that are known and are conventional in the laser art. To produce the read pulse $P_R$, laser 2 will be Q-switched to produce a peak power output for a very short time, i.e., nanoseconds. To achieve the write pulse $P_W$, a light chopper is used in the path of a continuous laser beam and would produce a $P_W$ of the order of milliseconds. To achieve $P_E$, a Q-switch having low efficiency can be used and such $P_E$ would be of the order of microseconds.

It is understood that many materials that are transparent and have the characteristic of having its state change from amorphous to crystalline and back to crystalline can be substituted for the specific material $Te_{85}Ge_{11}As_4$ chosen as the storage material. When other materials are used, it is understood that different laser frequencies are needed for writing into and interrogating these materials. Moreover, the transparencies and reflectivities of lenses, filters and mirrors will also be altered. However, the major thrust of the invention will not alter, namely, that a material can have its state altered by a laser beam and have the altered state produce a second harmonic of the very same laser beam used to read out such altered state.

What is claimed is:

1. A three dimensional memory comprising a solid material capable of having selected spots therein altered from an amorphous state to its crystalline state, a laser source of a given frequency focusable within different depths of said material and having sufficient energy for altering said selected spot from its amorphous state to its crystalline state, such alteration producing a condition capable of generating second harmonics means for interrogating and traversing such selected spot with the same frequency focused laser beam having considerably less energy than said material phase-changing beam so that a second harmonic of said laser frequency is generated by said selected spot of material if the latter is in its crystalline state but no second harmonic generation occurs if it is in the amorphous state when said less energetic beam traverses said selected spot, and means for detecting the presence of said second harmonic frequency within said interrogating beam after the latter has traversed said selected spot.

2. The three dimensional memory of claim 1 wherein the storage material is an amorphous semiconductor chalcogenide.

3. The three dimensional memory of claim 2 wherein the chalcogenide is $Te_{85}Ge_{11}As_{14}$.

4. A three dimensional memory comprising a solid material capable of having selected spots therein alterable from an amorphous state to its crystalline state by the application of a focused high energy laser beam at a selected spot, a confocal Fabry-Perot cavity having mirrors bounding said cavity, both mirrors being transparent to a given frequency f but reflective at frequency 2f, said transparent solid material located substantially at the center of said cavity, means for applying said focused high energy laser beam of a frequency f through a first of said mirrors onto a selected spot in said material for changing its state, and means for applying the same *f* frequency but considerably less energetic beam through said same first mirror to a selected spot of said material to interrogate said spot whereby the latter will generate a frequency 2f if it is in its crystalline state, which frequency is amplified by the mirrors of said confocal cavity.

5. The three dimensional memory of claim 4 wherein the second of said pair of mirrors in the Fabry-Perot cavity is partially transmissive to the harmonic frequency 2f.

* * * * *